(12) United States Patent
Disbennett et al.

(10) Patent No.: US 6,612,671 B2
(45) Date of Patent: Sep. 2, 2003

(54) SHELF MOUNTING SUPPORT ARRANGEMENT

(75) Inventors: Walter I. Disbennett, Knoxville, IL (US); John C. Ellingwood, Galesburg, IL (US); Daniel H. Smith, Galesburg, IL (US); Virgil R. Thompson, Cameron, IL (US)

(73) Assignee: Maytag Corporation, Newton, IA (US)

( * ) Notice: Subject to any disclaimer, the term of this patent is extended or adjusted under 35 U.S.C. 154(b) by 0 days.

(21) Appl. No.: 10/170,435

(22) Filed: Jun. 14, 2002

(65) Prior Publication Data
US 2002/0149303 A1 Oct. 17, 2002

Related U.S. Application Data

(62) Division of application No. 09/096,586, filed on Jun. 12, 1998, now Pat. No. 6,460,956.

(51) Int. Cl.$^7$ ............................................. A47B 96/04
(52) U.S. Cl. ...................... 312/408; 248/239; 29/418; 29/455.1
(58) Field of Search ................................. 312/406, 408; 29/423, 455.1, 460, 418; 62/298; 248/239; 156/78, 79; 220/592.09, 592.1

(56) References Cited

U.S. PATENT DOCUMENTS

| 1,291,321 A | | 1/1919 | Whittier et al. |
| 2,048,212 A | * | 7/1936 | Goulooze .................. 312/408 |
| 2,118,659 A | | 5/1938 | Sywert |
| 2,146,950 A | | 2/1939 | Foster |
| 2,330,044 A | | 9/1943 | Gaston |
| 2,620,255 A | | 12/1952 | Beckett |
| 2,684,884 A | | 7/1954 | Devery |
| 2,852,329 A | | 9/1958 | Smith |
| 3,264,699 A | | 8/1966 | Knowlton |
| 3,331,646 A | | 7/1967 | Peters |
| 3,669,520 A | | 6/1972 | Jansen |
| 3,917,206 A | | 11/1975 | Fisher |
| 4,005,919 A | | 2/1977 | Hoge et al. |
| 4,195,888 A | | 4/1980 | Squire |
| 4,534,530 A | | 8/1985 | Danko |
| 4,715,512 A | | 12/1987 | Buchser |
| 4,735,468 A | | 4/1988 | Taylor, Jr. et al. |
| 4,920,696 A | | 5/1990 | Mawby et al. |
| 5,335,988 A | * | 8/1994 | Lynn et al. .............. 312/406.2 |
| 5,361,599 A | | 11/1994 | Dasher |
| 5,560,695 A | | 10/1996 | Pufpaff |

* cited by examiner

Primary Examiner—Lanna Mai
Assistant Examiner—Jerry A. Anderson
(74) Attorney, Agent, or Firm—Diederiks & Whitelaw, PLC

(57) ABSTRACT

A shelf mounting support includes an annular flange portion having a side surface from which projects a cavity defining body portion. The mounting support is adapted to extend through an aperture formed in a liner of an appliance with the body portion of the mounting support being inserted in a respective aperture from an outer insulation zone side of the liner. Each mounting support is initially retained in the aperture through the use of an adhesive element that attaches the flange portion of the mounting support to the liner. Thereafter, the liner is positioned within an outer shell of the appliance and foamed insulation is then injected into the insulation zone and into the internal cavity of the mounting support to anchor the mounting support in position. To support a shelf, a plurality of mounting supports are arranged in a common plane upon which the shelf is adapted to rest.

9 Claims, 4 Drawing Sheets

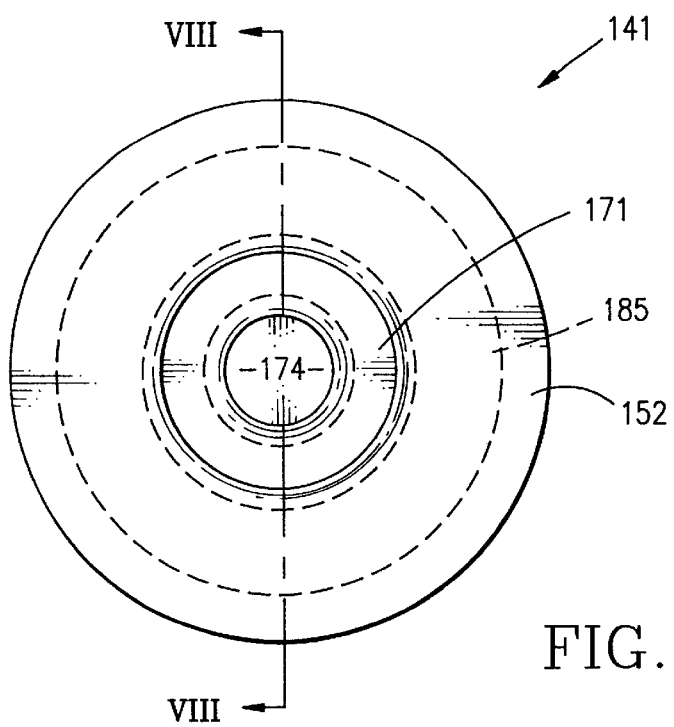
FIG. 7
FIG. 8
FIG. 9
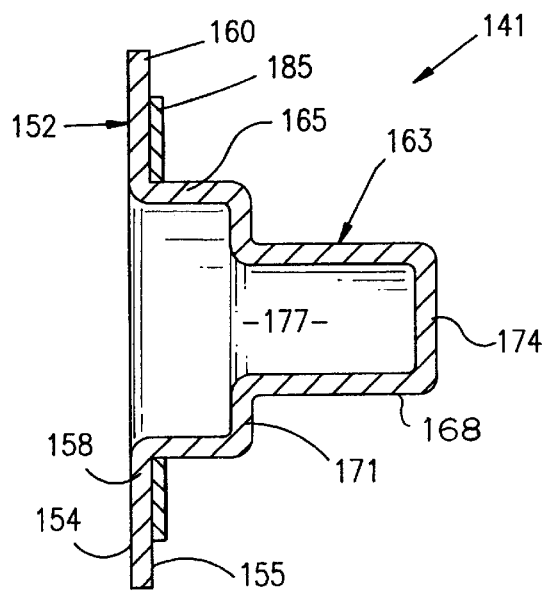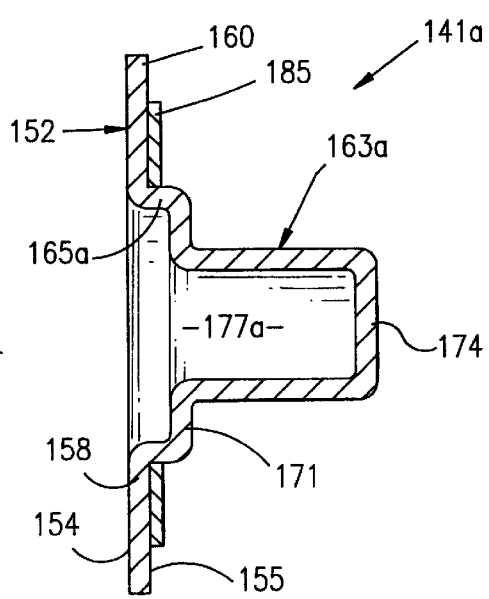

SHELF MOUNTING SUPPORT ARRANGEMENT

This application represents a divisional application of U.S. patent application Ser. No. 09/096,586 filed Jun. 12, 1998, now U.S. Pat. No. 6,460,956.

BACKGROUND OF THE INVENTION

1. Field of the Invention

The present invention pertains to an appliance having an outer shell within which is positioned a liner having walls which are spaced from the outer shell so as to define an insulation zone therebetween and, more particularly, to a support arrangement used to mount a shelf extending across the liner walls in such an appliance, as well as a method of supporting the shelf in the appliance.

2. Discussion of the Prior Art

In various types of appliances, it is common to provide some structure which will enable one or more shelves to be mounted within a given appliance compartment. For example, in a common household refrigerator, numerous shelves will be provided in order to enable various items to be supported at different vertical storage positions. In the prior art, these shelves are typically supported through specific mounting structure within the refrigerator. Such known mounting structure includes: integrally forming shelf supporting rails with a molded liner that defines the interior walls of a given refrigerator compartment; securing mounting brackets to opposing side walls of the liner through the use of threaded fasteners; and positioning mounting supports or grommets within apertures formed in the liner. Since it is highly desirable to permit the shelves to be vertically adjusted to selectively configure the overall shelving arrangement so as to accommodate varying sized items to be supported, multiple levels of these known mounting structures are generally provided in refrigerators.

When forming the liner of a refrigerator or other appliance, it is desirable to minimize the required thickness of the liner to reduce manufacturing costs. When the liner is integrally formed with the shelf supporting rails, the liner must be inherently thickened at the rails to some extent in order to assure that the rails will not fail under load conditions. Therefore, forming the shelf supporting structure in this manner generally adds to the manufacturing cost of the liner. In addition, if such a support rail were to fail or become damaged during use, serviceability is greatly limited.

Forming the mounting structure by attaching threaded fastener secured brackets to opposing side walls of the liner provides for enhanced servicing in the case of part failure since a new bracket can be readily installed in place of the damaged bracket. However, since any given shelf will generally require four or more mounting brackets and numerous shelves will be provided in each appliance, the original appliance assembly can be quite cumbersome and time consuming. In addition, this type of mounting structure has several parts which itself can add to the cost associated with the manufacturing of the appliance.

Attaching mounting supports or grommets in the liner walls in order to support shelves therefrom advantageously reduces the number of supporting components and can simplify the assembly process. With most known arrangements, the mounting supports are, for the most part, retained in a desired position due to an in situ foaming process. More specifically, body portions of the mounting supports are generally inserted, from a refrigerated compartment side, within apertures provided in the opposing side walls of the liner after the liner has been placed in an outer cabinet shell of the refrigerator or other appliance. Thereafter, the space between the liner and the cabinet shell is injected with foamed insulation which will inherently flow about the body portions of the mounting supports. Once solidified, the insulation will securely retain the mounting structure in the desired position.

Of course, such an arrangement requires that the mounting supports be held in the desired position during the insulation injection process. Since the mounting support is inserted in the aperture from the refrigerated side of the liner, the mounting support can be undesirably pushed back through the aperture during the foaming operation as the insulation bears against a wall of the support. To this end, it has been proposed to provide the mounting support with an annular flange at one end and locating structure on the body portion of the support at a position spaced from the annular flange a distance equal to the thickness of the liner. With this arrangement, the support can be inserted into a respective aperture until the liner is arranged between the annular flange and the locating structure to hold the support in the desired position for the foaming operation. Unfortunately, this mounting support arrangement requires a rather fine degree of tolerance between the thickness of the liner and the distance between the annular flange and the locating structure in order to assure that the mounting support will be retained in the desired position and the foamed insulation will not leak into the cabinet compartment.

In view of the above, there exists a need in the art for a shelf mounting support arrangement that can be readily installed within apertures of an appliance liner with minimal effort, time and associated cost, and which can be easily retained in a desired position before and during the insulating process, while avoiding the need for high manufacturing tolerances but assuring that the foamed insulation will not leak into the interior of the liner or undesirably displace the mounting support.

SUMMARY OF THE INVENTION

A support arrangement is provided for mounting a shelf in a compartment of an appliance having an outer shell within which is positioned a compartment defining liner having walls spaced from the outer shell so as to define an insulation zone therebetween. The mounting support includes an annular flange portion and a body portion that projects from the annular flange. The body portion, upon which a shelf is to be supported, is adapted to be placed into an aperture formed in a side wall of the liner from the insulation zone side of the liner, while the annular flange portion is positioned against an outer wall surface of the liner. In order to retain the mounting support in a desired position prior to injecting foamed insulation into the insulation zone, an adhesive element is used to secure the annular flange portion to the liner.

With this arrangement, the mounting support can be easily attached to an outer side wall surface of the liner in a desired position and retained in this position by the adhesive element. Thereafter, foamed insulation can be injected into the insulation zone in order to further anchor the mounting support. To aid in the interengagement between the body portion of the mounting support and the foamed insulation, while also structurally reinforcing the overall support arrangement, the body portion is advantageously provided with an internal cavity into which the insulation flows. In accordance with one embodiment of the invention which is particularly adapted to use in mounting certain types of shelving units in a refrigerator, a terminal end of the body portion is formed with an annular groove adapted to receive a portion of a shelf to maintain a desired positioning of the shelf regardless of any shrinkage of the liner upon cooling of the enclosure. A method of mounting a shelf utilizing such a support arrangement is also provided in accordance with the invention.

Additional features and advantages of the present invention will become more readily apparent from the following detailed description of preferred embodiments of the invention when taken in conjunction with the drawings wherein like reference numerals refer to corresponding parts in the several views.

BRIEF DESCRIPTION OF THE DRAWINGS

FIG. 7 is a front view of the shelf mounting support of FIG. 6;

FIG. 8 is a cross-sectional view generally taken along line VIII—VIII in FIG. 7; and FIG. 9 is a cross-sectional view, similar to that of FIG. 8, but of a third shelf mounting support embodiment of the invention.

DETAILED DESCRIPTION OF THE PREFERRED EMBODIMENTS

Figure 1:
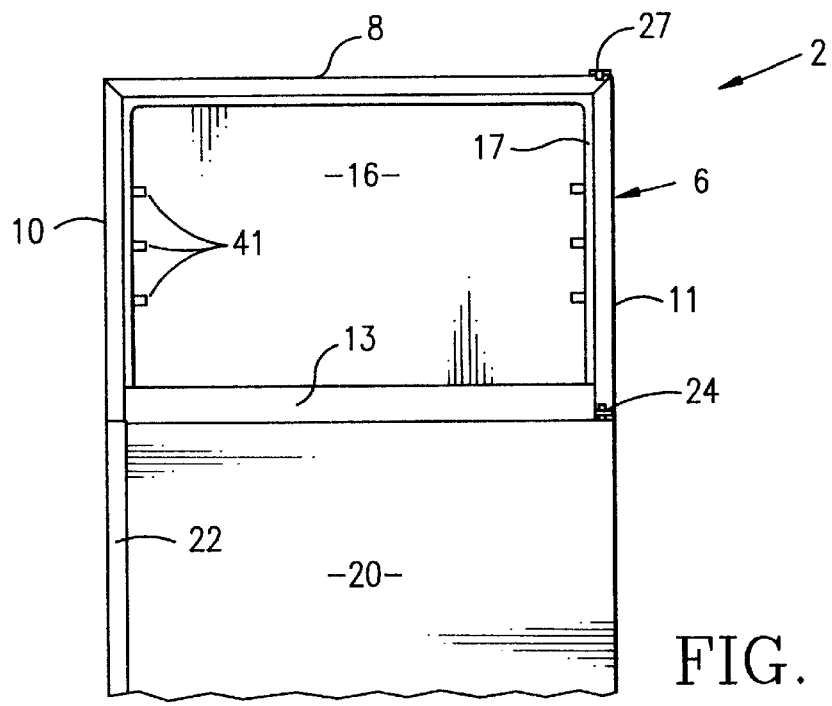
FIG. 1 is a front view of a refrigerator illustrating the positioning of various shelf mounting supports, constructed in accordance with the present invention, in a freezer compartment of the refrigerator.

With initial reference to FIG. 1, the shelf mounting support arrangement of the present invention is shown for use in connection with a refrigerator 2 which comprises a cabinet shell 6 including a top wall 8 and side walls 10 and 11. As is known in the art, cabinet shell 6 of refrigerator 2 also includes a rear wall (not shown) that is secured to each of the top and side walls 8, 10 and 11, with each of the walls being typically formed of sheet metal. In the embodiment depicted for descriptive purposes, refrigerator 2 constitutes a top-mount style refrigerator and therefore includes a mullion 13 which separates the interior of refrigerator 2 into an upper freezer compartment 16, that is defined by a liner 17 positioned within cabinet shell 6, and a fresh food compartment (not shown), that is located below mullion 13 and which has an access door 20 positioned thereacross. As is well known in the art, door 20 can be opened by means of a handle 22 and is pivotally mounted through a central hinge unit 24, as well as a lower hinge unit (not shown). Of course, freezer compartment 16 would also be provided with a door that could be selectively opened and closed and which would pivot upon central hinge unit 24, as well as an upper hinge unit 27. However, in order to better illustrate the aspects of the present invention, such a freezer door has not been shown in FIG. 1.

Figure 2:
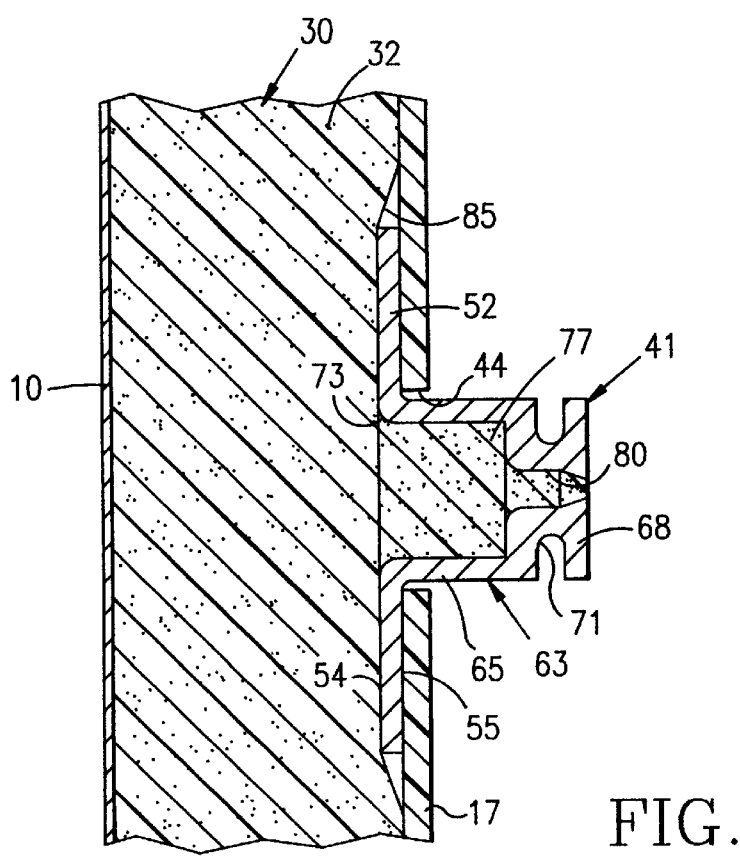
FIG. 2 is a cross-sectional view illustrating the construction and mounting of a shelf support formed in accordance with a first preferred embodiment of the invention.

With reference to FIGS. 1 and 2, liner 17 is shown spaced from side wall 10 so as to define a zone 30 therebetween. In a similar manner, liner 17 is also spaced from top wall 8 and side wall 11. Zone 30 is adapted to receive insulation 32 which, in the preferred embodiment, is constituted by foamed insulation that is injected between liner 17 and cabinet shell 6 during a latter stage in the assembly of refrigerator 2.

Of course, the basic structure described above is found in numerous refrigerators readily available in the marketplace. In fact, in order to permit better stacking of items placed within refrigerator 2, it is known to provide various shelves which can be selectively positioned at varying vertical heights. The present invention is actually directed to the particular manner in which shelves can be supported at a selected height within refrigerator 2. In accordance with the present invention, one or more shelves are adapted to be supported by particularly constructed mounting supports indicated at 41. Each mounting support 41 is actually part of a set of mounting supports, with each set being arranged in a different horizontal plane to enable a shelf to be placed at a desired height. Each mounting support 41 is adapted to be inserted and retained within a respective aperture 44 formed in liner 17. Prior to describing the particular manner in which each mounting support 41 is retained and anchored in a desired position, reference will be made to FIGS. 2–4 in describing the structure of a first preferred embodiment of mounting support 41.

Figure 3:
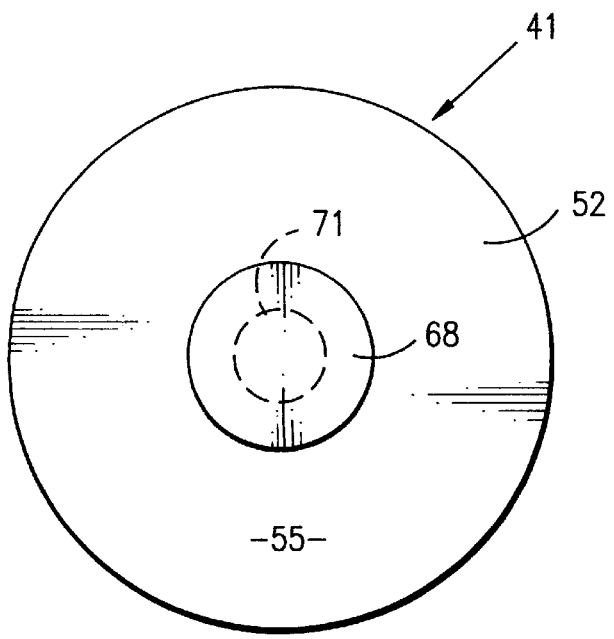
FIG. 3 is a front view of the shelf mounting support constructed in accordance with the first embodiment.
Figure 4:
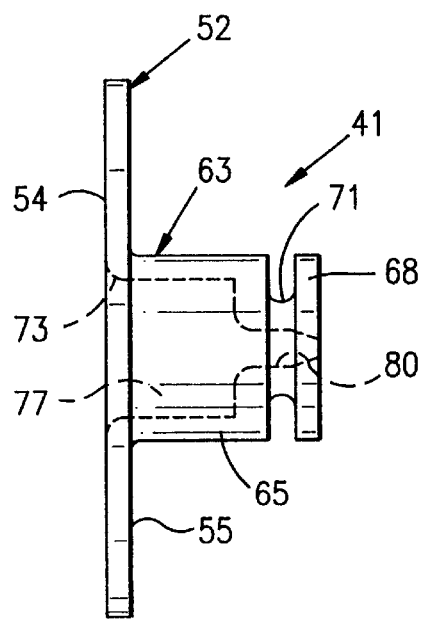
FIG. 4 is a side view of the shelf mounting support of the first embodiment.

As shown in FIGS. 2–4, mounting support 41 includes an annular flange portion 52 that has first and second opposing sides 54 and 55. Projecting from second side 55 of annular flange portion 52 is a body portion 63 of mounting support 41. Body portion 63 includes a first portion 65 and a second portion 68 which is interconnected to first portion 65 by an annular grooved portion 71. As clearly shown in FIGS. 2 and 4, mounting support 41 has a central opening 73 formed in flange portion 52 that leads to an internal cavity 77 defined within first portion 65. In addition, an internal passageway 80, leading from cavity 77, is preferably formed through both grooved portion 71 and second portion 68 of body portion 63 for the reason which will become fully apparent.

FIG. 2 will now be particularly referenced in describing the manner in which mounting support 41 is initially retained in a desired position and then anchored in place. Prior to interconnecting the basic structure of refrigerator 2, including cabinet shell 6, mullion 13 and liner 17, body portion 63 of each mounting support 41 is inserted within a respective aperture 44 formed in liner 17 from the to-be-insulated side of liner 17, i.e., on the outer side of liner 17 which aids in defining zone 30, such that body portion 63 projects into compartment 16. The insertion of the mounting supports 41 in apertures 44 can be performed manually or through a robotic operation. Apertures 44 can be formed either during the molding stage of liner 17 or, if vacuum formed, can be subsequently drilled or pierced therein. When body portion 63 is fully inserted, an adhesive element 85 is advantageously used to attach flange portion 52 to liner 17. In the embodiment of FIG. 2, adhesive element 85 constitutes a strip of tape that adheres to both flange portion 52 and liner 17. A central hole (not labeled) is either pre-formed in the strip of tape or the strip of tape is punctured to create an opening leading into cavity 77. Of course, each mounting support 41 is similarly attached to liner 17. Once this interengagement occurs, each mounting support 41 will be retained in its desired position and liner 17 can be positioned within cabinet shell 6.

As indicated above and shown in FIG. 1, various vertically spaced sets of mounting supports 41 can be provided to enable adjustability of a given shelf. Once each of the mounting supports 41 is installed in the manner described above, the foamed insulation 32 can be injected between liner 17 and cabinet shell 6. The foamed insulation 32 will inherently flow into cavity 77 of each mounting support 41. With this arrangement, after the foamed insulation solidifies, each mounting support 41 will not only be securely anchored in position but the solidified insulation within cavity 77 will structurally reinforce body portion 63. As clearly shown in FIG. 2, passageway 80 tapers and opens at second portion 68. This opening will permit air to bleed out of cavity 77 to assure that cavity 77 is completely filled with the foamed insulation.

Figure 5:
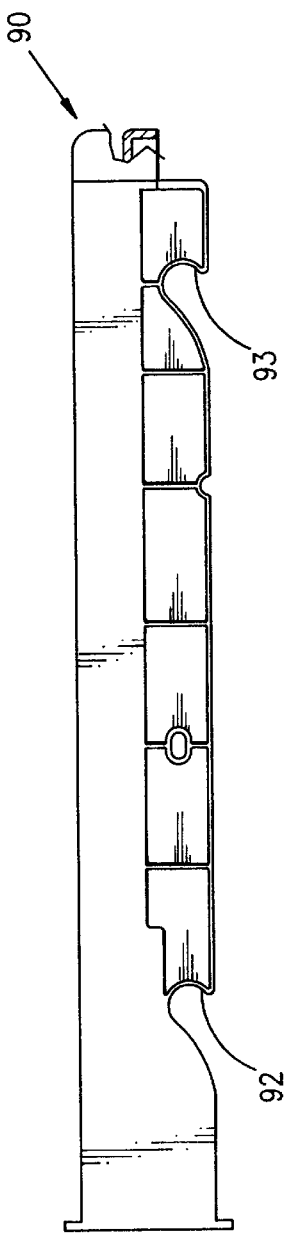
FIG. 5 is a side view of a shelf adapted to be used with the mounting support arrangement of the invention.

Once the mounting supports 41 are securely anchored in position, a shelf 90, such as that shown in FIG. 5, can be readily supported on a given set of mounting supports 41. More specifically, with each set of mounting supports 41 constituting, in accordance with the preferred embodiment, two pairs of mounting supports positioned in a common plane along opposing side walls (not labeled) of liner 17, shelf 90 includes a pair of fore-to-aft spaced slots 92 and 93 on each side thereof which receive respective body portions 63. As shown, slots 92 and 93 preferably slope forwardly and upwardly to facilitate positioning and retaining of shelf 90 on the selected set of mounting supports 41 in a generally horizontal plane.

As additional specifics of shelf 90 are not considered part of the present invention, they will not be discussed herein. In fact, it should be understood that mounting supports 41 can be used in connection with various types of shelves, including molded plastic, combination plastic/glass and wire shelves without departing from the invention. However, utilizing a shelf with at least a molded plastic frame, such as shelf 90, is preferred, particularly when mounting supports 41 are utilized in the fresh food compartment of a refrigerator. In this case, such as when mounting a crisper shelf, it has been found advantageous to have a portion of the shelf frame extend within the grooved portion 71 of each mounting support 41 in order to enhance the retention of the shelf in case the liner shrinks during use. Therefore, from the above discussion, it should be apparent that the presence of groove portion 71 is optional, depending on the particular type of shelf being supported.

Figure 6:
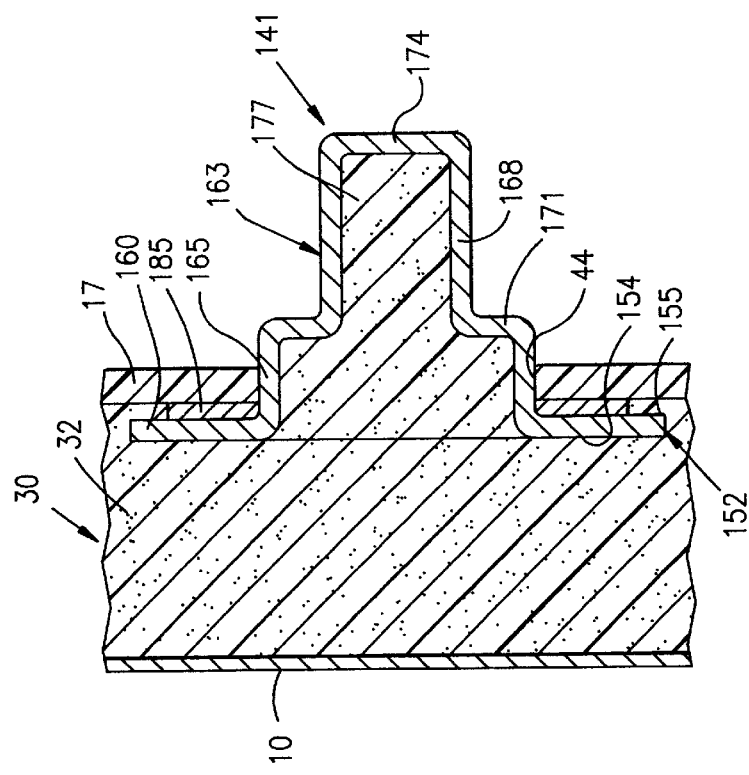
FIG. 6 is a cross-sectional view, similar to that of FIG. 2, but depicting a shelf mounting support constructed in accordance with a second embodiment of the invention.

With this in mind, reference will now be made to FIGS. 6–9 in describing additional mounting support embodiments of the invention. As shown in FIGS. 6–8, a mounting support 141 constructed in accordance with another embodiment of the invention includes an annular flange portion 152 that has first and second opposing sides 154 and 155. Projecting from second side 155 of annular flange portion 152 is a body portion 163 of mounting support 141. Body portion 163 includes a first diametric portion 165 and an integrally formed, second diametric portion 168 that has a terminal end wall 174. In a manner similar to mounting support 41, body portion 163 of mounting support 141 defines an internal cavity 177 that is adapted to receive a flow of foamed insulation or the like following retaining of mounting support 141 in a corresponding aperture 44 and completing the assembly of liner 17 to shell 6.

Mounting support 141 is also adapted to be initially attached to liner 17 through the use of an adhesive element 185 which, in this illustrated embodiment, is secured to second side 155 of annular flange portion 152 adjacent body portion 163. Although adhesive element 185 can constitute various adhesive substances known in the art, in the preferred embodiment, adhesive element 185 constitutes double-sided adhesive tape. Based on the above and as shown in FIG. 6, mounting support 141 is retained in aperture 44 in a manner generally commensurate with mounting support 41 described above, except that adhesive element 185 is interposed between flange portion 152 and liner 17.

Although in this embodiment first diametric portion 165 and aperture 44 are sized to have a minimum gap therebetween, even if manufacturing tolerances are expanded, the positioning of adhesive element 85 from first diametric portion 165 outward towards outer end 160 of annular flange portion 162 will advantageously provide a seal that will prevent the undesired ingress of the injected foamed insulation 132 from entering freezer compartment 16. Since the adhesive element 185 is annular as clearly shown in FIG. 7, positioning adhesive element 185 along any portion of second side 155 of annular flange portion 152 will effectively provide a complete annular seal about aperture 44. Of course, although adhesive element 185 is only shown to extend from directly adjacent body portion 163 towards outer end 160 in these figures, adhesive element 185 can extend entirely to outer end 160 to prevent the flow of foamed insulation 32 between annular flange portion 152 and liner 17 to minimize the development of axial forces tending to push mounting support 141 away from liner 17.

From the above description, it should be readily apparent that each mounting support 41 and 141 can be readily attached to liner 17 and retained in a desired position with a minimal amount of time and effort through the use of various types of adhesive elements. In the preferred embodiments, each mounting support 41 and 141 is injection molded of plastic. Of course, various changes and/or modifications can be made to the structure and mounting of supports 41 and 141 without departing from the spirit of the invention. For example, FIG. 9 illustrates an embodiment of a mounting support 141a which differs only from mounting support 141 in basically the length of first body portion 163a and, more particularly, in the length of first portion of 165a and therefore cavity 177a. Other portions of mounting support 141a have been identified with corresponding reference numerals and will not be discussed in detail. In any event, the invention is only intended to be limited by the scope of the following claims.

We claim:

1. A method of providing a support for a shelf that extends between opposing side walls of a liner positioned within an outer shell of an appliance with the side walls being spaced from the outer shell so as to define an insulation zone therebetween, said method comprising:

forming a plurality of spaced apertures in each of the side walls of the liner;

inserting a body portion of a shelf mounting support into each of said plurality of spaced apertures;

adhesively attaching a flange portion of each shelf mounting support to a respective wall surface of the liner by interposing a strip of double-sided adhesive tape between the flange portion and the liner; and retaining the shelf mounting support in a desired position by providing insulation between the side walls of the liner and the outer shell.

2. The method according to claim 1, further comprising: locating the body portions of a selected set of the shelf support members within side slots defined by the shelf.

3. The method according to claim 1, further comprising: forming the body portion with an internal cavity.

4. A method of providing a support for a shelf that extends between opposing side walls of a liner positioned within an outer shell of an appliance with the side walls being spaced from the outer shell so as to define an insulation zone therebetween, said method comprising:

forming a plurality of spaced apertures in each of the side walls of the liner;

forming a body portion of a shelf mounting support with a grooved portion at a position spaced from a flange portion, with the grooved portion being adapted to receive a portion of the shelf;

inserting the body portion of the shelf mounting support into each of said plurality of spaced apertures;

adhesively attaching the flange portion of each shelf mounting support to a respective wall surface of the liner; and retaining the shelf mounting support in a desired position by providing insulation between the side walls of the liner and the outer shell.

5. The method according to claim 4, further comprising: utilizing a strip of tape in adhesively attaching the flange portion of each shelf mounting support to the liner.

6. The method according to claim 5, wherein the strip of tape constitutes a double-sided adhesive tape interposed between the flange portion and the liner.

7. A method of providing a support for a shelf that extends between opposing side walls of a liner positioned within an outer shell of an appliance with the side walls being spaced from the outer shell so as to define an insulation zone therebetween, said method comprising:

forming a plurality of spaced apertures in each of the side walls of the liner;

inserting a body portion, including an internal cavity and having a passage that leads from the internal cavity through the body portion, of a shelf mounting support into each of said plurality of spaced apertures;

adhesively attaching a flange portion of each shelf mounting support to a respective wall surface of the liner;

retaining the shelf mounting support in a desired position by providing insulation between the side walls of the liner and the outer shell, while foaming the shelf mounting supports in situ by injecting foamed insulation into the insulation zone, with the insulation flowing into the internal cavity; and permitting air to bleed out the internal cavity through the passage as the internal cavity fills with the foamed insulation.

8. The method according to claim 7, further comprising: utilizing a strip of tape in adhesively attaching the flange portion of each shelf mounting support to the liner.

9. The method according to claim 8, wherein the strip of tape constitutes a double-sided adhesive tape interposed between the flange portion and the liner.

* * * * *